(12) United States Patent
Milner

(10) Patent No.: US 7,475,932 B2
(45) Date of Patent: Jan. 13, 2009

(54) WINDSCREEN

(76) Inventor: Peter James Milner, Hinckley (GB);
Kirsten Milner, legal representative,
100d Leicester Road, Hinckley,
Leicestershire LE10 1LU (GB)

( * ) Notice: Subject to any disclaimer, the term of this patent is extended or adjusted under 35 U.S.C. 154(b) by 444 days.

(21) Appl. No.: 10/501,273

(22) PCT Filed: Jan. 10, 2003

(86) PCT No.: PCT/GB03/00073

§ 371 (c)(1),
(2), (4) Date: Oct. 6, 2005

(87) PCT Pub. No.: WO03/058295

PCT Pub. Date: Jul. 17, 2003

(65) Prior Publication Data

US 2006/0082891 A1    Apr. 20, 2006

(30) Foreign Application Priority Data

Jan. 11, 2002  (GB) ................................. 0200524.7

(51) Int. Cl.
*B60J 1/02*   (2006.01)
(52) U.S. Cl. .................. 296/84.1; 296/96.14; 353/16
(58) Field of Classification Search ............... 296/84.1, 296/96.12, 96.14; 353/13, 38
See application file for complete search history.

(56) References Cited

U.S. PATENT DOCUMENTS

| | | | |
|---|---|---|---|
| 1,678,479 A | | 7/1928 | Patten, et al. |
| 2,953,961 A | | 9/1960 | Court |
| 3,038,756 A | | 6/1962 | Heimer |
| 3,826,562 A | | 7/1974 | Baumgardner et al. |
| 3,972,596 A | * | 8/1976 | Baumgardner et al. ...... 359/737 |
| 4,358,182 A | | 11/1982 | Hayes et al. |
| 4,896,953 A | | 1/1990 | Cobb, Jr. |
| 5,617,245 A | * | 4/1997 | Milner ........................ 359/402 |
| 6,636,370 B2 | * | 10/2003 | Freeman ..................... 359/894 |
| 6,866,918 B2 | * | 3/2005 | Sauer .......................... 428/172 |

FOREIGN PATENT DOCUMENTS

DE        616 635 C     8/1935
JP        2000-233687 A  *  8/2000

* cited by examiner

*Primary Examiner*—Jason S Morrow
(74) *Attorney, Agent, or Firm*—Steven J. Hultquist; Intellectual Property Technology Law

(57) ABSTRACT

A glazing element (12) for an opening defined by opaque boundaries (13) has an edge region (E) shaped to divert light passing through it in a sense such as to enlarge the field of view through the opening. For this purpose the bounding surfaces (33, 34) of the element (12) diverge towards the edge thereof in the edge region (E). The same effect can be achieved by an element (25) adhered to or otherwise held in position to the surface of the element (12) in the edge region (E).

17 Claims, 6 Drawing Sheets

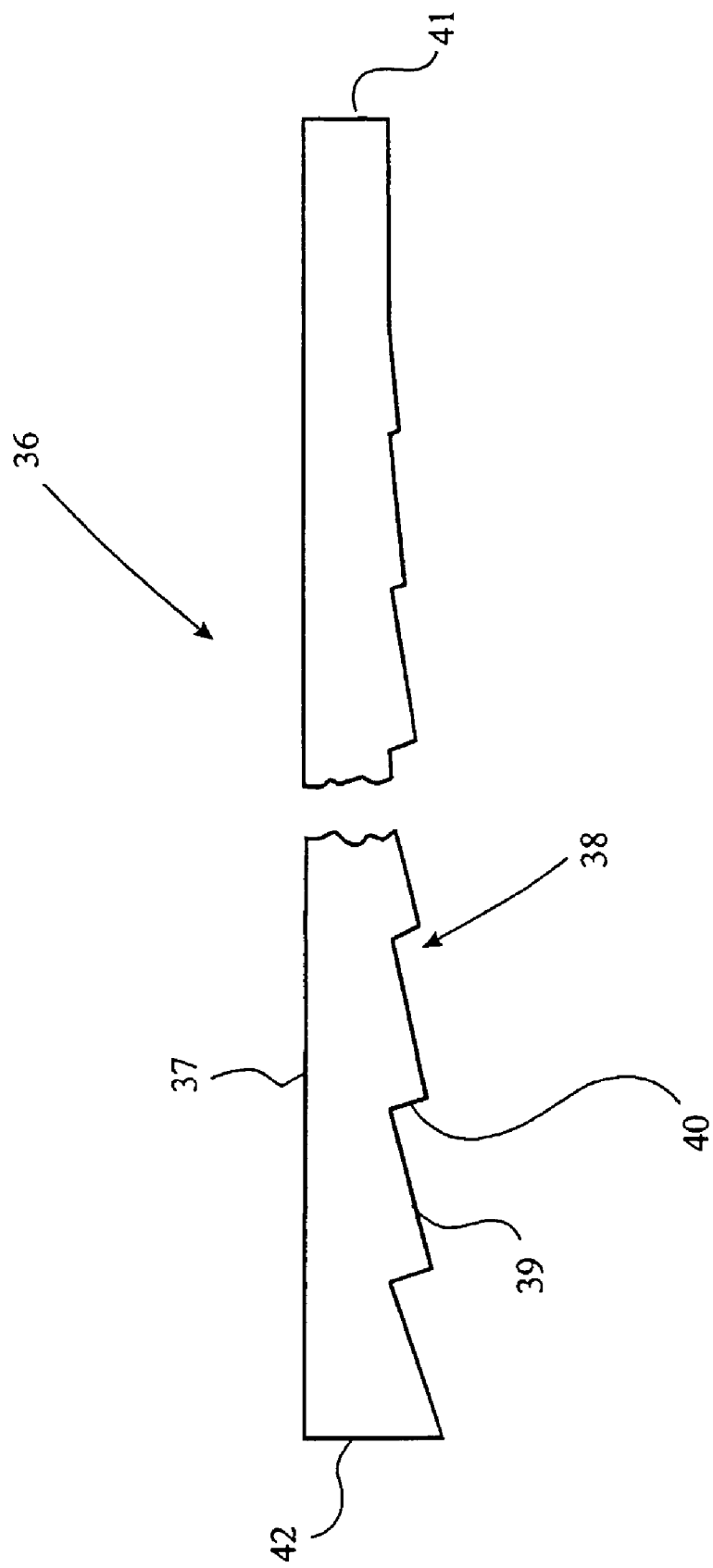

WINDSCREEN

CROSS REFERENCE TO RELATED APPLICATIONS

This application claims foreign priority benefits pursuant to 35 U.S.C. §119 and 35 U.S.C. §365 based on application number 0200524.7 filed in the United Kingdom on Jan. 11, 2002 and international application PCT/GB02/00073 filed on Jan. 10, 2003.

The present invention relates generally to improvements in optical systems, and in particular to optical systems involving openings defined by opaque boundaries and glazed with one or more glazing elements.

BACKGROUND OF THE INVENTION

The opaque boundaries of glazed openings or apertures constitute a termination or interruption in the field of view available through the opening. This is widely recognized and accommodated in most circumstances by the ability of the observer to change position thereby varying the field of view through the opening. There are, however, circumstances where the observer's ability to change his field of view is limited and/or the field-limiting effect of the opaque boundary is of more than usually critical importance.

Window apertures often contain frames or glazing bars which act as light barriers to interrupt the field of view available through the aperture. Usually this is of little or no consequence, and the restricted field of view is acceptable; at other times it is possible, as mentioned above, to overcome the obscuration by adjusting the observation position. Furthermore, in unassisted binocular vision, if the barrier is narrower than the inter-ocular distance (about 60 mm) one or other eye can generally receive light from objects which the other eye cannot see because of the obscuration due to the barrier. In some viewing tasks, however, the ability to observe areas obscured by glazing bars or aperture boundaries does become critical. If the barrier is wider than the interocular distance and it is not desirable or possible for the observer to adjust the observation position in order to mitigate the obscuration created by the barrier the problem is exacerbated.

BRIEF SUMMARY OF THE INVENTION

The present invention seeks to provide means by which the field of view through an opening obscured by opaque boundaries can be enlarged even for a viewer having a fixed observation position.

This is achieved, according to the invention, by providing a glazing element for an opening defined by opaque boundaries, having or incorporating means for diverting light passing through an edge region of the opening whereby to enlarge the field of view through the opening. The said means for diverting light may be a separate element which can be positioned appropriately in relation to the edge region, or may be a specific conformation of the edge region itself. In an opening defined by rectilinear boundaries, the term "edge region" will be understood to refer to an edge defined by one rectilinear boundary, and not the entirety of the boundary of the opening. In other words, in the case of a rectangular or square opening, the "edge region" may be a region along one (or more) side (or sides) of the opening whilst other sides of the opening have no such view-enlarging arrangement.

The present invention finds particular application in the automotive industry where motor vehicle windows are bounded by frame parts of the vehicle which, for reasons of strength and rigidity, have to have a certain minimum thickness. This applies particularly to the so-called A and B pillars, namely the pillars on either side of the windscreen (the A pillars) and the pillars between the front and rear doors (the B pillars). It is the A pillars which are of particular concern since they define the lateral extent of the driver's field of view forwardly through the windscreen, which is the most critical from a safety point of view. In addition, the A pillars are not vertical, but usually raked at an angle which, in modern vehicles, approaches 45 degrees in order to accommodate the inclination of the windscreen for aerodynamic purposes. This means that the lateral extent of the obscuration caused by the A pillar is in fact greater than its transverse thickness, and further increased by the fact that the upper part of the A pillar is closer to the observer than the lower part, and therefore subtends a greater horizontal, angle at the observer's eye for a given width.

Although the driver of a motor vehicle has a certain freedom to move his head in order to minimise the effect of the barrier constituted by the A pillars, such movement requires a certain amount of time, and also relies on the driver being aware of the presence or possible presence of an object in that part of his field of view obscured by the A pillars. If the driver is unaware of the presence of an object in the obscured part of his field of view the fact that it would have been possible to observe it by movement of the head is irrelevant. Moreover, situations can arise, when two objects are in relative motion, in which the obscuration region moves in synchronism with the obscured object so that the latter remains out of the field of view of the driver for an extended period thereby increasing a potentially hazardous situation.

The principles of the present invention have particular application to the windscreen of a motor vehicle obscured at its lateral peripheral regions by thick A pillars since the presence of light-diverting means in or associated with each lateral edge region of the vehicle can make it possible for an observer effectively to have a field of view in which the obscuration effect of the A pillars is at least minimised and, in some cases, cancelled altogether.

By providing a glazing element as defined hereinabove, having means for diverting light passing through an edge region thereof, the observer may view otherwise obscured objects without the need for movement of the head.

In a preferred embodiment of the invention the means for diverting light passing through an edge region of the glazing element is integrally formed with the said element. However, the means for diverting light passing through an edge region of the element may be formed separately from the said element, and fixed, attached or otherwise held in position or relative juxtaposition with respect thereto.

In essence, the present invention provides a glazing element adapted to fit into an opening defined by opaque boundaries and having a central region through which light can pass substantially undeviated and at least one edge region which diverts light through an angle such as to bring its apparent direction, that is the direction of the refracted light, when projected back in a straight line through the refractor, closer to the central region of the opening, thus in effect, causing the light at the edges of the opening to bend around the glazing element as it passes through the refractor from an object towards the observer. The diversion of light is in practice achieved by refraction, and the angle through which the light is diverted may be greater closer to the edge of the element. In fact, the angle through which the light is diverted preferably decreases away from the edge of the element smoothly to a point where zero diversion takes place. In other words, the light-diverting means preferably introduces no step-change in light diversion at its edge remote from the boundary. This may be achieved, for example, by making the light-diverting effect vary over the width of the light diverting means. In the case of a refractor this can be achieved by varying the inclination of the surfaces of the refractor such that it is zero (that is the surfaces are substantially parallel) at a point inward from the boundary, and increases progressively towards the boundary. This creates what may be considered as a negative lens, and in the case of a motor vehicle windscreen, the negative lens may be substantially cylindrical. Because the boundary of the windscreen is inclined to the vertical, however, it is preferred that the axis of the cylindrical lens is not parallel to the boundary itself, but inclined at an angle such as to result in the major plane of magnification (negative magnification, of course, it being a negative lens) of the image by the cylindrical lens being closer to the horizontal, preferably being horizontal.

In a preferred embodiment of the invention the glazing element comprises at least two layers of optically transparent material joined face-to-face over substantially the whole area thereof, the edge region of each of the said two layers being formed such that the two layers diverge from one another towards the periphery of the said element with an optical medium of appropriate refractive index between them whereby to form a negative cylindrical lens over the said edge region. This has the advantage that there is no surface discontinuity between the region of the glazing element over which no light diversion takes place and the region of the element at which light is diverted.

The diverging peripheral regions of the glazing element layers may be held apart by a thickened layer of transparent adhesive or by a wedge-shape insert located between them. As will be appreciated, for a given divergence angle of the two layers, the refractive index of the material between the layers will determine the precise angle through which light is diverted as it is transmitted therethrough.

Alternatively, a refractor, which may be a Fresnel refractor, may be attached, secured or held in a fixed relative positional relationship with respect to an edge region of the element. Of course, the light diverting means may be located not only at one edge region of the element, for example the edge region of a windscreen adjacent the driver or passenger-side A pillar, but also at other edge regions including the upper edge region where it may assist in viewing traffic lights when positioned close thereto. A windscreen formed with such a light-diverting upper edge region may have this region shaded or coloured in order to make it clear to the driver that the light arriving through this region has been diverted thereby making it easier to judge angles and distances through the uncoloured non-diverting part of the windscreen.

The present invention also comprehends an optical element for extending the field of view through an edge region of an opening defined by opaque boundaries, comprising a refractor adapted to fit against a glazing element of the opening in the said edge region thereof and to divert light passing therethrough towards the observer through an angle such as to bring it closer to the normal to the plane of the glazing element. In another aspect the present invention provides a motor vehicle windscreen having an optical element as defined above.

BRIEF DESCRIPTION OF THE SEVERAL VIEWS OF THE DRAWINGS

Various embodiments of the present invention will now be more particularly described, by way of example, with reference to the accompanying drawings, in which:

FIG. 8 is an enlarged cross section of an optical element of Fresnel form for use with a glazing element.

DETAILED DESCRIPTION OF THE INVENTION

Figure 1:
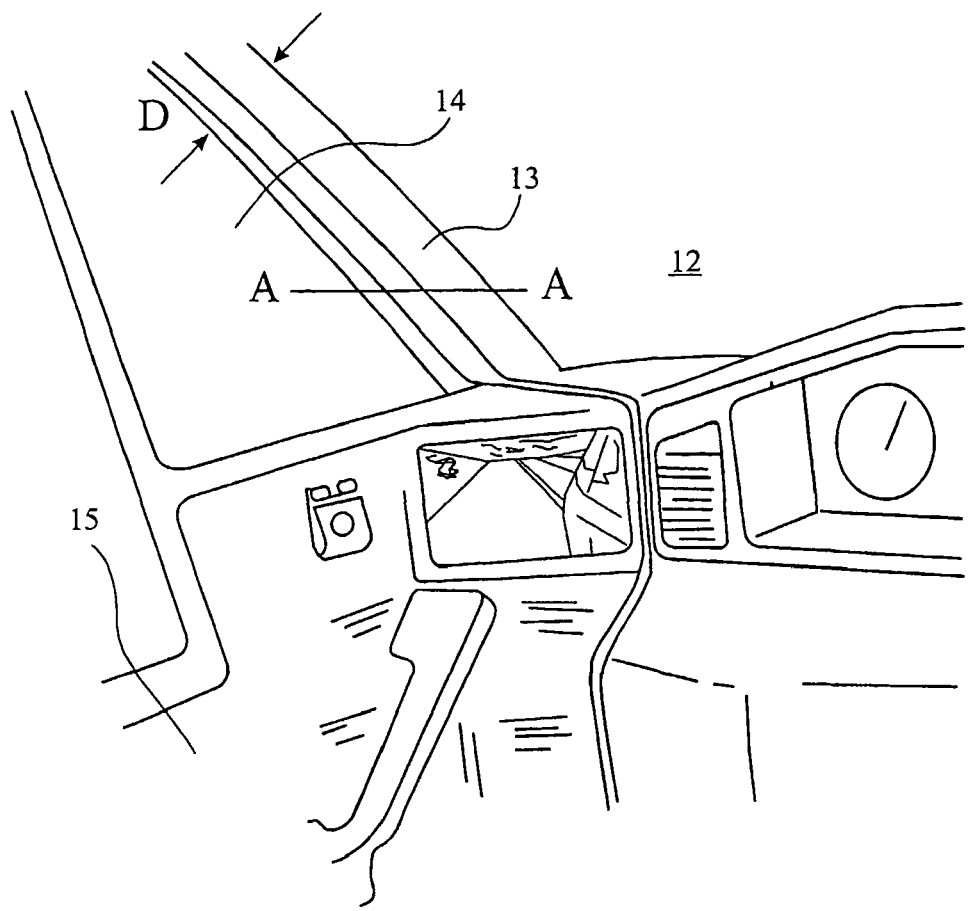
FIG. 1 is a partial internal perspective view of the interior of a motor vehicle.
Figure 2:
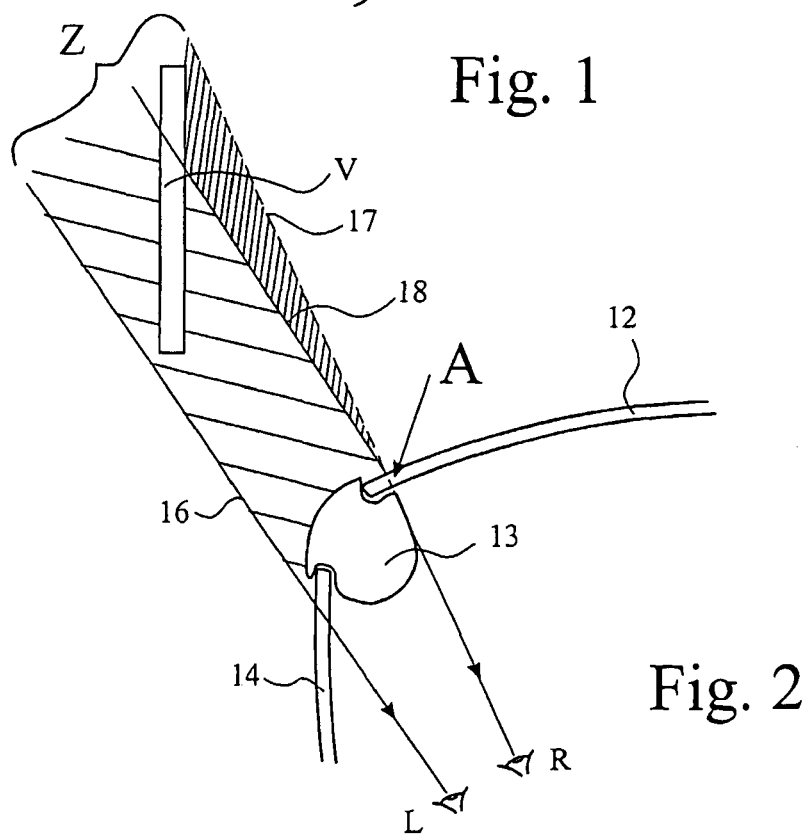
FIG. 2 is a cross-section through the line A-A of FIG. 1 useful in explaining the principles of the present invention.

Referring first to FIG. 1 a front portion of a motor vehicle passenger compartment is illustrated, showing the driver's side of a windscreen opening 12 of an LHD vehicle, defined by an A pillar 13 which forms a boundary between the windscreen 12 and a front quarter light or side window 14 of a door 15. As will be appreciated, the windscreen 12 is raked through an angle approaching 45 degrees, and the A pillar 13 has a significant thickness D which, from the driver's position, can constitute a significant barrier, particularly in view of the fact that it, too, is strongly raked so that its effective width, parallel to the line A-A, is greater than its transverse width as represented by D. As can be seen in FIG. 2 an observer cannot see anything within the obscuration zone Z defined between two ray paths 16, 17 respectively leading from the observer's left eye L past the left edge of the pillar 13 and the observer's right eye R passing the right edge of the pillar 13.

Although the drawing is foreshortened for the purpose of illustration, it will be seen that an elongate object, such as a cyclist occupying a volume such as that represented by the rectangular area V lies entirely within the obscuration zone Z and, therefore, cannot be observed by the observer without displacement of the eyes by moving the head from side to side to vary the position of the obscuration zone Z. Although this may occur if the observer is alert to the possibility of an object in the obscuration zone, this may not happen if the observer has no reason to suppose that the obscuration zone requires monitoring, and this could result in a dangerous situation, particularly if the vehicle is following a curved path and/or the object in the shaded region V is following a path such that the relative movement between itself and the vehicle lies along the obscuration zone Z.

If, however, according to the invention an optical element is placed at an edge region of the windscreen 12 and acts to divert the light passing through the windscreen 12 towards the normal to the windscreen 12, and thus towards the observer's eyes L, R then light arriving in the direction shown by the ray 18 will reach the observer's right eye R, and the obscuration zone Z will be reduced by the wedge-shape area between the rays 17, 18 resulting, in this example, in a part of the vehicle V being visible to the observer without any movement of the head being required. Although the entirety of the vehicle V is not in sight, it is sufficient that a part of it be visible for the observer to be alerted to its presence. If the A pillar 13 has a thickness of, for example, 100 mm the observer using unaided binocular vision will require the diverted light to be turned through no more than about 4 degrees in order to reduce the obscuration region to a minimum, that is where the obscuration region is defined between two parallel rays 16, 18 and is, therefore, no greater than the width of the barrier 13 even at a distance. In the absence of such light diversion the obscuration region Z increases in width with increasing distance from the barrier and is, therefore, capable of obscuring larger objects at a greater distance. With this small diversion, therefore, the obscuring effect of the A pillar 13 is, consequently, effectively negated.

Figure 3:
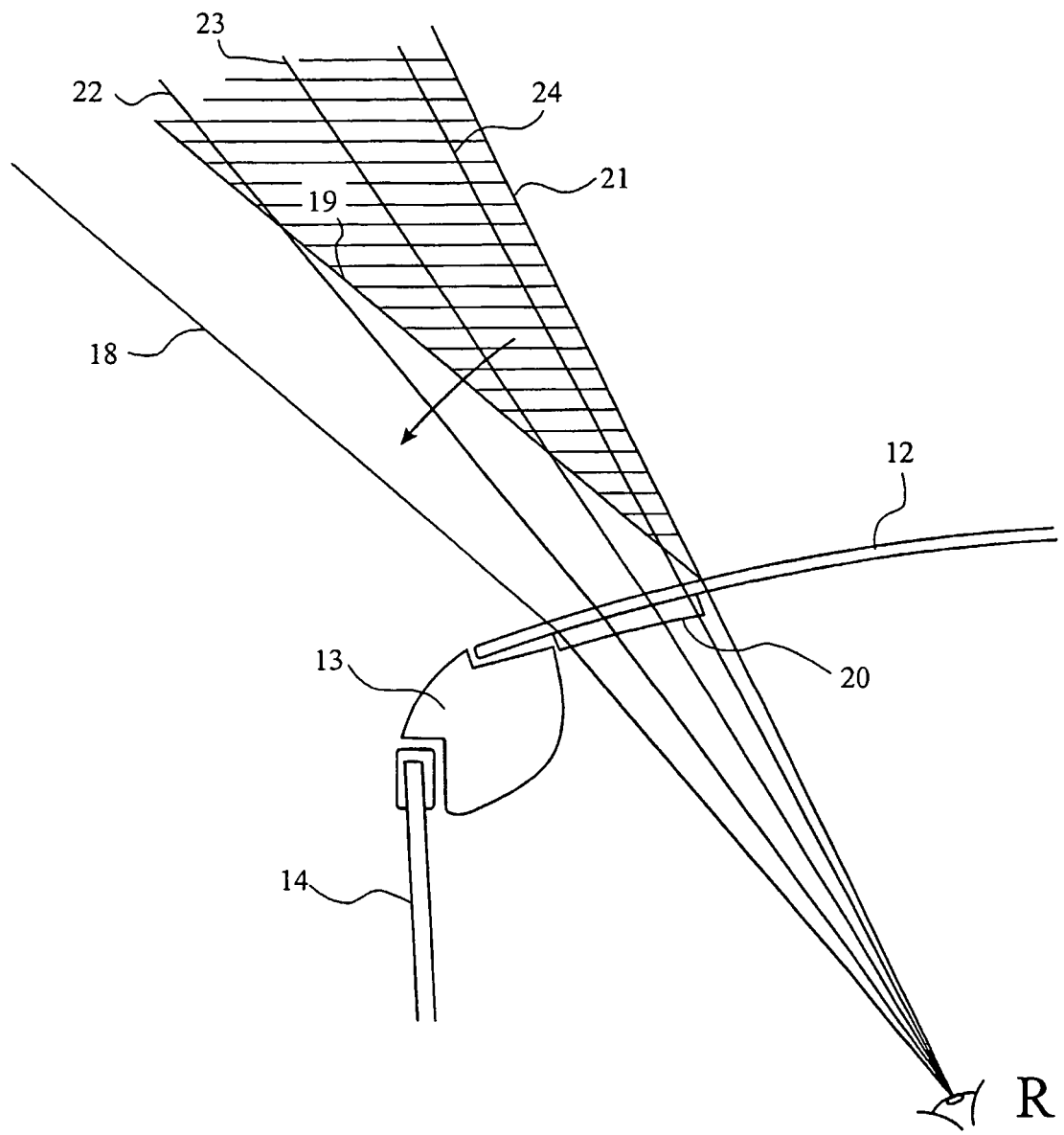
FIG. 3 is a cross section similar to that of FIG. 2, illustrating the presence of a light-diverting optical element.
Figure 4:
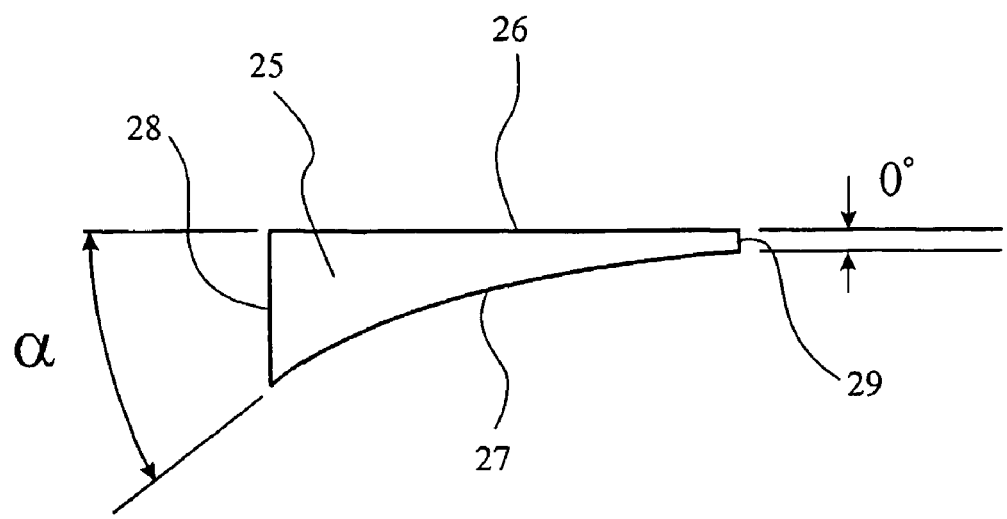
FIG. 4 is a cross-section illustrating the form of one embodiment of light-diverting optical element.
Figure 5:
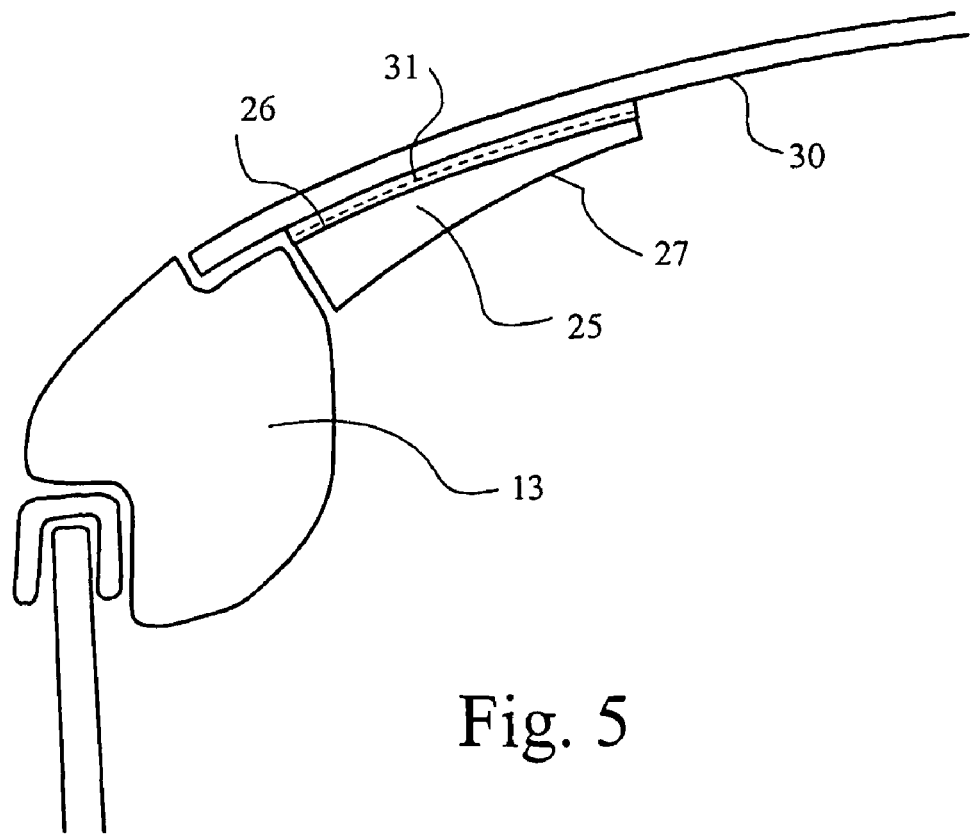
FIG. 5 is a partial cross-section illustrating a glazing element formed as an embodiment of the present invention.

Of course, it is not sufficient simply to cause light diversion at the point A as illustrated in FIG. 2, but rather to divert light incident on the windscreen 12 over a more extensive region adjacent the edge of the windscreen 12 in contact with the A 0 pillar 13 (herein referred to as "an edge region") and FIG. 3 illustrates some of the consideration arising from this. As can be seen in FIG. 3, in which the same reference numerals have been used to identify the same or corresponding components, light diversion is achieved by means of an additional component 20 fitted on the inside of the windscreen 12 in the edge region thereof. The precise nature of the light-diverting optical component 20 will be described in more detail below, it being sufficient at this stage to establish that it causes light transmitted therethrough to be diverted from its incident angle. If the light-diverting effect were constant across the width of the element 20 as shown by the two rays 18 and 19 this would create its own obscuration zone in view of the fact that the first light ray 21 passing undeviated through the windscreen 12, that is not passing through the light-diverting element 20, and reaching the right eye R of the observer would effectively create an obscuration region between the rays 19 and 21 thereby effectively negating the benefit of having reduced the obscuration effect of the A pillar 13. For this reason it is preferred that the light-diverting properties of the optical element 20 vary across its width, as shown by rays 22, 23, 24 which illustrate progressively less deflection for rays further from the A pillar 13 until, at the very edge of the element 20 the ray 24 passes through effectively undeviated so that an object observed by the observer's right eye does not have a step-change as the eye passes across the boundary element 20. FIGS. 4 and 5 illustrate ways in which this effect can be achieved.

Referring now to FIG. 4 a light-diverting optical element in the form of a cylindrical negative lens is shown in section. The lens 25 as illustrated has a flat face 26, a concavely curved major surface 27, and an end face 28. In practice, of course, the substantially flat face 26 may be slightly convexly curved to accommodate the curvature of a windscreen as illustrated in FIG. 3. The length of the cylindrical lens 25 does not have to be as great as the length of the A pillar 13 since the significant region as far as potential visible objects are concerned, occupies only a central part of the length of the A pillar 13. For example the lens may be only about 200 mm long although, of course, it may be the same length as the A pillar if desired. At most the element 25 may be about 3 mm thick (this being the width of the end face 28 and the maximum divergence angle between the face 26 and the face 27 may be in the region of six degrees. The face 27 is an acylindrical curvature with a shorter radius near the end 28 and a longer radius at the opposite or thinner end 29, which may be in the region of 1 mm thick. An element of this form may be fitted, as shown in FIG. 5, on the rear face 30 of the windscreen 12 closely adjacent the A pillar 13, with a layer of transparent adhesive 31 securing it in position. As will be appreciated from an observation of FIG. 5, the face 26 of the element is convexly curved to match the curvature of the windscreen 12. The element 25 may be a simple moulding, manufactured using an optical thermoplastic and, if not as long as the A pillar 13, may be positioned at about vision height such that the significant part of the observer's field of view lies through the element 25.

As an alternative (not illustrated) the face 27 of the element 25 may be formed in elementary segments (Fresnel form) to provide the same optical characteristics as the lens illustrated in FIG. 5. In this case it is possible, and may be preferable, to arrange that the optical axis of the lens is not parallel to the principle physical axis of the device which is parallel to the A pillar 13. Indeed, this arrangement is also possible with a non-segmented lens, as illustrated in FIG. 5, but the manufacture of such a lens is more difficult. The advantage of this configuration is that the image of a horizontal line in the object field (such as the horizon itself) is maintained horizontal even upon divergence by the optical element so that the horizon is not bent upwardly by the optical element as would be the case if the axis of the cylindrical surface 27 were parallel to the A pillar 13. In a Fresnel lens this is achieved simply by orienting the grooves which form the segments in such a way that they are not parallel to the principal physical axis of the device; in this case they would be inclined at an angle such that when the device is fitted to an A pillar the grooves or ribs appear substantially vertical to the observer.

Figure 6:
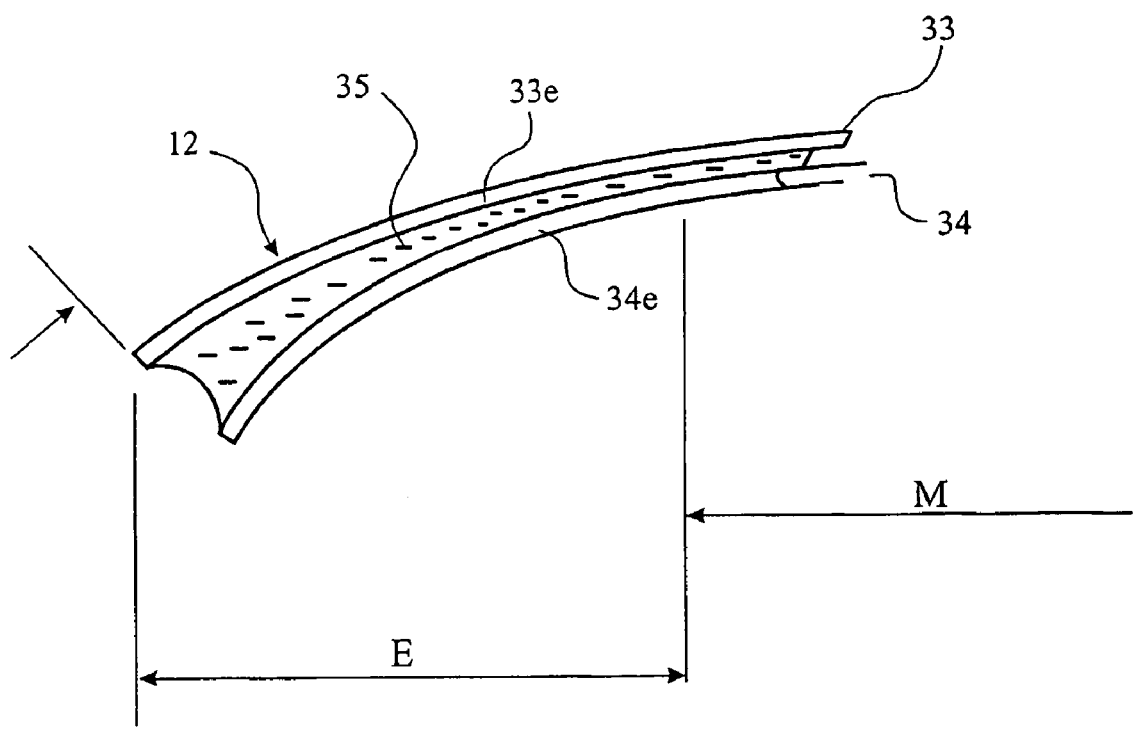
FIG. 6 is a cross-section illustrating an alternative form of optical element suitable for use with a glazing element.

Referring now to FIG. 6 this illustrates a modified laminated windscreen incorporating an edge region having lens properties as described in relation to FIG. 4. In this drawing the windscreen 12 comprises a laminated structure having a front panel 33, a rear panel 34 and an intervening laminating adhesive 35. In the main region of the windscreen 12 the front and rear panels 33, 34 are parallel to one another and the adhesive 35 is of constant thickness. In the edge region E, however, the rear panel 34 is curved so as to diverge from the front panel 33. The diverging edge region 34e may be held spaced from the edge region 33e of the front panel 33 by a thicker layer of laminating adhesive, or by an interposed wedge-section insert (not illustrated). As discussed above, the angle of divergence needs to be no more than about 6 degrees at the greatest, that is at the very edge of the element, reducing to zero where the edge region E meets the main central portion M of the windscreen. This is a particularly elegant solution from the vehicle manufacturer's point of view as it involves no extra parts nor any change to the vehicle assembly procedure. Furthermore, with only a small modification being required to the windscreen tooling and manufacturing process, and with possibly no extra parts being required, the cost of incorporating the device into a windscreen is expected to be very small. In effect, this implementation consists of no more than a slight swelling of the laminating adhesive layer thickness towards the lateral edges of the windscreen. This, of course, has to be done under very controlled conditions in order to achieve the right curvature of the rear panel 34 in the edge region 34e.

It will be appreciated that, as least as far as its application to motor vehicle windscreens is concerned, even a small degree of light diversion at the edges of the windscreen is better than none at all in that it reduces the hazard caused by thick A pillars. In fact, the optimum solution for windscreens may not be complete elimination of the object field obscuration zone because of the accommodation difficulties between eye and brain which may be caused when different images are presented to the brain by the two eyes. However, experience in the use of the now-commonly adopted aspheric driver side external rear view mirror fitted to motor car door mirrors suggests that, although familiarisation time may be required, this may result in a valuable improvement in safety. Partial reduction in the obscuration zone achieved according to the invention has particular attractiveness for motor vehicle manufacturers since a small increase in the thickness of the laminating adhesive towards edges will provide at least a degree of light-diversion without it being necessary to make any modifications to the way in which the windscreen is fitted to the vehicle, and with no modifications to the vehicle at all.

It is also important to note that an edge region along the substantially horizontal edges of a windscreen may be provided with a light-diverting properties either integrally as in the embodiment of FIG. 6 or by the addition of an optical element as in the embodiment of FIGS. 4 and 5. This may provide, in the case of the upper edge of a windscreen, an extended upward view to assist in the visibility of traffic lights which are sometime obscured by the roofline of a vehicle, especially when it is stationary close to the traffic light. An extended view through a lower region of a windscreen may not be of any particular benefit unless it can improve the view of the front part of the vehicle for manoeuvring or parking, and this would also be of benefit in the rear window of hatchbacks, estate cars and the like.

Figure 7:
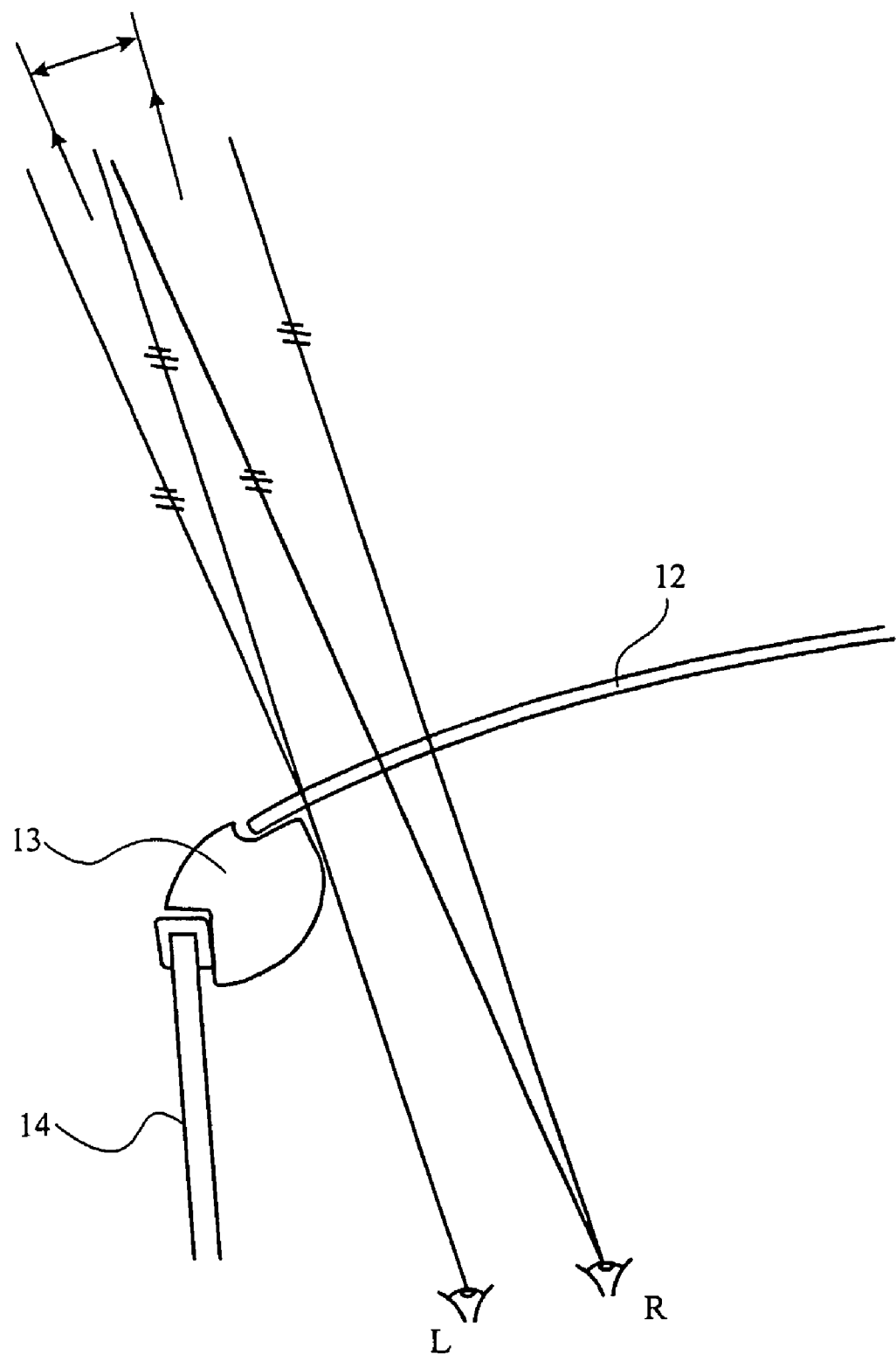
FIG. 7 is a schematic axial section illustrating the light deflection and useful for explaining various characteristics of the invention.

For any embodiment of the invention used in motor vehicles it will be noted that the light diversion, as shown in FIG. 7, results in the possibility that, with both eyes looking through the windscreen at a distant object, the one nearer the A pillar may be viewing the object through the light-diverting device, whilst the other eye is viewing the same object through an undiverted light path. Consequently a convergence angle of the eyes is necessary in contrast to the "parallel" eye configuration which would be needed if the device where not present. Convergence of the eyes is not normal when viewing distant objects although, of course, does occur when viewing close objects. It is, therefore, a physical condition to which the eyes are accustomed and requires only familiarisation to achieve comfortable observation. By providing an aperture with light-diverting means according to the invention this effectively increases the size of the aperture by an amount equal to the angle that the light is deflected. This applies to both binocular and monocular observation.

As can be seen in FIG. 8 an optical element 36 for attachment to a glazing panel may be made as a Fresnel prism. The element 36 has a plane, smooth flat front face 37 (although this may be curved as in the other embodiments) and a serrated rear face 38 comprising a plurality of facets 39 separated by risers 40. The inclination of the facets to the plane of the front face 37 varies across the width of the device from zero at the right hand end (as viewed in the drawings) which in this case is the end furthest from the edge of the opening and increasing in inclination according to a quadratic relationship in which the angle α between a facet 39 and the plane of the front face (or the tangent to the front face if this is curved as in the other, embodiments) increases with an increase in distance x from the right hand end 41 (that is the end at which α=0°) according to $$\alpha = kx^2$$

where κ is a constant.

In the present embodiment, and with dimensions in the region of those outlined below, κ=0.003. This is appropriate for an element in which the width of the element between the ends 41 and 42 is in the region of 50 mm, with a minimum thickness of 2 mm at the end 41, a microstructure pitels of 0.808 mm using a material having a refractive index of approximately 1.53.

In this embodiment the riser draft angle is 10° at the narrow end 41 and changes by 0.1° per mm across the width of the element. For use in a motor vehicle the dimensions and proportions discussed above ensure that the riser presents the minimum obstruction to the passage of light by being oriented approximately parallel to the light approaching the observer's eye. At the same time the image magnitude has no step change at the "narrow" end 41 so that there is no perceptible variation in the image as the observer's eye sweeps across the central part of the windscreen and on to the optical element 36 at the end 41. As it continues to sweep towards the edge of this windscreen (to the left as viewed in FIG. 8) the progressive change in the facet angle causes a progressive reduction in the image width (there being no change in the image height as the "lens" is effectively an acylindrical one) until at the far end 42 the image width is reduced by 30% of its width when viewed through the non-deviating central part of the windscreen.

Although illustrated as flat in this embodiment it will be understood that the front face 37 may be curved, for example to match the curvature of a windscreen.

The invention claimed is:

1. A glazing element for a window opening, the window opening being surrounded by opaque boundaries, the glazing element having an edge region which in use is adjacent to an opaque boundary, the glazing element having or incorporating means for diverting light passing through the edge region whereby the field of view through the opening is enlarged, the means for diverting light comprising an optical element located within the edge region and having a plurality of facets separated by risers, the risers having a draft angle, wherein the draft angle of the risers varies across the optical element.

2. A glazing element according to claim 1 wherein the means for diverting light passing through an edge region of the element is integrally formed with said glazing element.

3. A glazing element according to claim 1 wherein the means for diverting light passing through an edge region of the element is formed separately from the said element and fixed, attached or otherwise held in with respect thereto.

4. A glazing element according to claim 1, adapted to fit into said window opening and having a central region through which light can pass substantially undeviated and an edge region which refracts light through an angle as it passes therethrough, the angle being greater closer to the edge of the element.

5. A glazing element according to claim 4, wherein the means for diverting light passing through an edge region of the element is so formed that there is no substantial surface discontinuity between the region of the element over which no light diversion takes place and the region of the element at which light is diverted.

6. A glazing element according to claim 1, wherein said means for diverting light passing through an edge region of the element is located at two opposite edge regions of the element.

7. A glazing element according to claim 1 formed as a motor vehicle windscreen.

8. An optical element adapted for fitting to or locating in association with a motor vehicle windscreen, to form a glazing element for the windscreen opening, the windscreen opening being surrounded by opaque boundaries, the glazing element having an edge region which in use is adjacent to an opaque boundary, the glazing element having or incorporating means for diverting light passing through the edge region whereby the field of view through the windscreen opening is enlarged, the means for diverting light comprising an optical element located within the edge region and having a plurality of facets separated by risers, the risers having a draft angle, wherein the draft angle of the risers varies across the optical element.

9. An optical element according to claim 8 wherein the means for diverting light has a plane face and a facetted face and the angle of inclination of the facets with respect to the plane face varies with the square of the distance from one edge of the element.

10. An optical element according to claim 9, wherein the angle of inclination of the facets varies according to the relation:

$$\alpha = kx^2$$

where: k is a constant and x is the distance from the narrow end of the element.

11. An optical element according to claim 10, wherein the constant k is 0.003.

12. An optical element according to claim 8 wherein the pitil of the facets across the width of the element is in the region of 0.5 mm.

13. An optical element according to claim 1 wherein the draft angle of the risers varies by 0.1° per mm across the width of the element.

14. An optical element according to claim 1 wherein the draft angle of the risers is in the region of 10° at the narrow end of the element.

15. A motor vehicle windscreen having an optical element affixed or otherwise held or secured in position thereon, the optical element extending the field of view through the windscreen and comprising a Fresnel lens having a plurality of facets separated by risers, with the draft angle of the risers varying across the Fresnel lens, the Fresnel lens being fitted against the windscreen in an edge region thereof to divert light passing therethrough towards the observer through an angle such as to bring its apparent direction towards a central region of the windscreen.

16. A motor vehicle windscreen according to claim 15, wherein the optical element is a generally cylindrical negative Fresnel lens oriented such that its direction of greatest (negative) magnification is generally horizontal.

17. A glazing element according to claim 1, in which the optical element is spaced away from the opaque boundary.

* * * * *